United States Patent
Moyal et al.

(10) Patent No.: US 11,971,814 B2
(45) Date of Patent: Apr. 30, 2024

(54) DIGITAL TWIN FUNCTIONAL AND NON-FUNCTIONAL SIMULATION TESTING

(71) Applicant: International Business Machines Corporation, Armonk, NY (US)

(72) Inventors: Shailendra Moyal, Pune (IN); Sarbajit K. Rakshit, Kolkata (IN); Venkata Vara Prasad Karri, Visakhapatnam (IN); Akash U. Dhoot, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 17/387,072

(22) Filed: Jul. 28, 2021

(65) Prior Publication Data
US 2023/0036410 A1    Feb. 2, 2023

(51) Int. Cl.
G06F 11/36    (2006.01)
G06F 30/20    (2020.01)
G06F 119/02   (2020.01)

(52) U.S. Cl.
CPC ...... *G06F 11/3696* (2013.01); *G06F 11/3692* (2013.01); *G06F 30/20* (2020.01); *G06F 2119/02* (2020.01)

(58) Field of Classification Search
CPC .. G06F 11/3696; G06F 11/3692; G06F 30/20; G06F 2119/02
See application file for complete search history.

(56) References Cited

U.S. PATENT DOCUMENTS

| 9,721,216 B2 * | 8/2017 | Lane ..................... G06Q 10/06 |
| 2019/0356556 A1 * | 11/2019 | Vicat-Blanc ............ G06F 30/20 |

(Continued)

FOREIGN PATENT DOCUMENTS

| EP | 3572913 | 11/2019 |
| WO | 2020162868 | 8/2020 |

OTHER PUBLICATIONS

Mell, P. et al., "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

(Continued)

*Primary Examiner* — Wei Y Zhen
*Assistant Examiner* — Amir Soltanzadeh
(74) *Attorney, Agent, or Firm* — KONRAD, RAYNES, DAVDA & VICTOR LLP; Janaki K. Davda

(57) ABSTRACT

Provided are techniques for digital twin functional and non-functional simulation testing. An indication is received that digital twin functional and non-functional simulation testing is to start for an application being developed, where a first portion of code for the application has been developed and a second portion of the code for the application has not been developed. Application data and an application landscape are retrieved. The digital twin functional and non-functional simulation testing is performed to identify which functional and non-functional requirements are not being met by the first portion of the code. For the functional and non-functional requirements that are not being met, suggestions are provided for at least one of the first portion and the second portion to meet one or more of the functional and non-functional requirements. One or more of the suggestions are implemented.

20 Claims, 10 Drawing Sheets

(56) References Cited

U.S. PATENT DOCUMENTS

| | | | |
|---|---|---|---|
| 2020/0065891 A1* | 2/2020 | Kapoor | G06F 8/33 |
| 2020/0133661 A1* | 4/2020 | Alexander | G06F 11/3684 |
| 2021/0216444 A1* | 7/2021 | Gefen | G06F 11/3688 |
| 2021/0342836 A1* | 11/2021 | Cella | H04L 9/3239 |
| 2021/0405976 A1* | 12/2021 | Gaitonde | G06F 11/3664 |

OTHER PUBLICATIONS

Mell, P. et al., "The NIST Definition of Cloud Computing (Draft)", Sep. 2011, Computer Security Division Information Technology Laboratory National Institute of Standards and Technology, Total 7 pp.

Wikipedia "Digital Twin" (online) Retrieved from the Internet on Apr. 29, 2021 at URL>https://en.wikipedia.org/wiki/Digital_twin, Total 12 pages.

"Application Landscape Definition" (online) Retrieved from the Internet on Apr. 29, 2021 at URL> https://www.dragon1.com/terms/application-landscape-definition, Total 4 pages.

ENGLOM "Simulation Plays in the Gartner Top Ten Tech Trends for 2018" dated Apr. 8, 2018, (online) retrieved from the Internet at URL>https://blogs.windriver.com/wind_river_blog/2018/04/simulation-plays-in-the-gartner-top-ten-tech-trends-for-2018/, Total 11 pages.

"Digital Twin: Innovate the Way to Test" (online) Retrieved from the Internet on May 19, 2021 at URL>https://www.wipro.com/engineeringNXT/digital-twin-innovate-the-way-to-test/, Total 10 pages.

* cited by examiner

DIGITAL TWIN FUNCTIONAL AND NON-FUNCTIONAL SIMULATION TESTING

BACKGROUND

Embodiments of the invention relate to digital twin functional and non-functional simulation testing. In particular, embodiments of the invention relate to near real time digital twin functional and non-functional simulation testing while code for an application is being developed.

A product development lifecycle includes a requirements phase (in which requirements for the product (e.g., application) are collected), a design phase (in which the product is designed), a development phase (in which the product is developed), and a validation phase (in which the developed product is validated against the requirements) with re-iterative processing based on feedback (e.g., received from an end user). The life cycle depends on the understanding of the teams in the various phases. In particular, the life cycle, and how many iterations are needed (e.g., validation shows that further design/development is needed) may be based on the teams' understanding of the requirements so that the requirements are molded into a deliverable product.

Conventional systems or frameworks validate the developed product against the functional requirements given by customers or from other channels.

SUMMARY

In accordance with certain embodiments, a computer-implemented method is provided for digital twin functional and non-functional simulation testing. The computer-implemented method comprises operations. An indication is received that digital twin functional and non-functional simulation testing is to start for an application being developed, where a first portion of code for the application has been developed and a second portion of the code for the application has not been developed. Application data is retrieved that includes functional and non-functional requirements for the application being developed. An application landscape is retrieved for the application being developed, where the application landscape includes the application being developed and other applications. The digital twin functional and non-functional simulation testing is performed to identify which functional and non-functional requirements are being met and which functional and non-functional requirements are not being met by the first portion of the code. For the functional and non-functional requirements that are not being met, suggestions are provided for at least one of the first portion and the second portion to meet one or more of the functional and non-functional requirements. One or more of the suggestions are implemented to meet the one or more of the functional and non-functional requirements.

In accordance with other embodiments, a computer program product is provided for digital twin functional and non-functional simulation testing. The computer program product comprises a computer readable storage medium having program code embodied therewith, the program code executable by at least one processor to perform operations. An indication is received that digital twin functional and non-functional simulation testing is to start for an application being developed, where a first portion of code for the application has been developed and a second portion of the code for the application has not been developed. Application data is retrieved that includes functional and non-functional requirements for the application being developed. An application landscape is retrieved for the application being developed, where the application landscape includes the application being developed and other applications. The digital twin functional and non-functional simulation testing is performed to identify which functional and non-functional requirements are being met and which functional and non-functional requirements are not being met by the first portion of the code. For the functional and non-functional requirements that are not being met, suggestions are provided for at least one of the first portion and the second portion to meet one or more of the functional and non-functional requirements. One or more of the suggestions are implemented to meet the one or more of the functional and non-functional requirements.

In accordance with yet other embodiments, a computer system is provided for digital twin functional and non-functional simulation testing. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. An indication is received that digital twin functional and non-functional simulation testing is to start for an application being developed, where a first portion of code for the application has been developed and a second portion of the code for the application has not been developed. Application data is retrieved that includes functional and non-functional requirements for the application being developed. An application landscape is retrieved for the application being developed, where the application landscape includes the application being developed and other applications. The digital twin functional and non-functional simulation testing is performed to identify which functional and non-functional requirements are being met and which functional and non-functional requirements are not being met by the first portion of the code. For the functional and non-functional requirements that are not being met, suggestions are provided for at least one of the first portion and the second portion to meet one or more of the functional and non-functional requirements. One or more of the suggestions are implemented to meet the one or more of the functional and non-functional requirements.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In certain embodiments, a digital twin based ecosystem provides a real customer simulation environment that performs digital twin functional and non-functional simulation testing during application development with integrated applications. A digital twin may be described as a virtual representation that serves as the real-time digital counterpart of a real customer environment.

The digital twin based ecosystem has digital twin based near real time digital twin functional and non-functional simulation testing (i.e., simulation testing) while an application is being developed. The functional requirements may be described as what the application is intended to do (e.g., update and move data). The non-functional requirements may be described as desired performance objectives (e.g., respond to a request to move data in a pre-determined amount of time). The application being developed ("developing application") may be a new application being created or may be an existing application being updated (i.e., modified). Developing an application includes writing code to implement the functional and non-functional requirements. With embodiments, functionality or functionalities may refer to both functional and non-functional features. Requirements may also be referred to as specifications.

Figure 1:
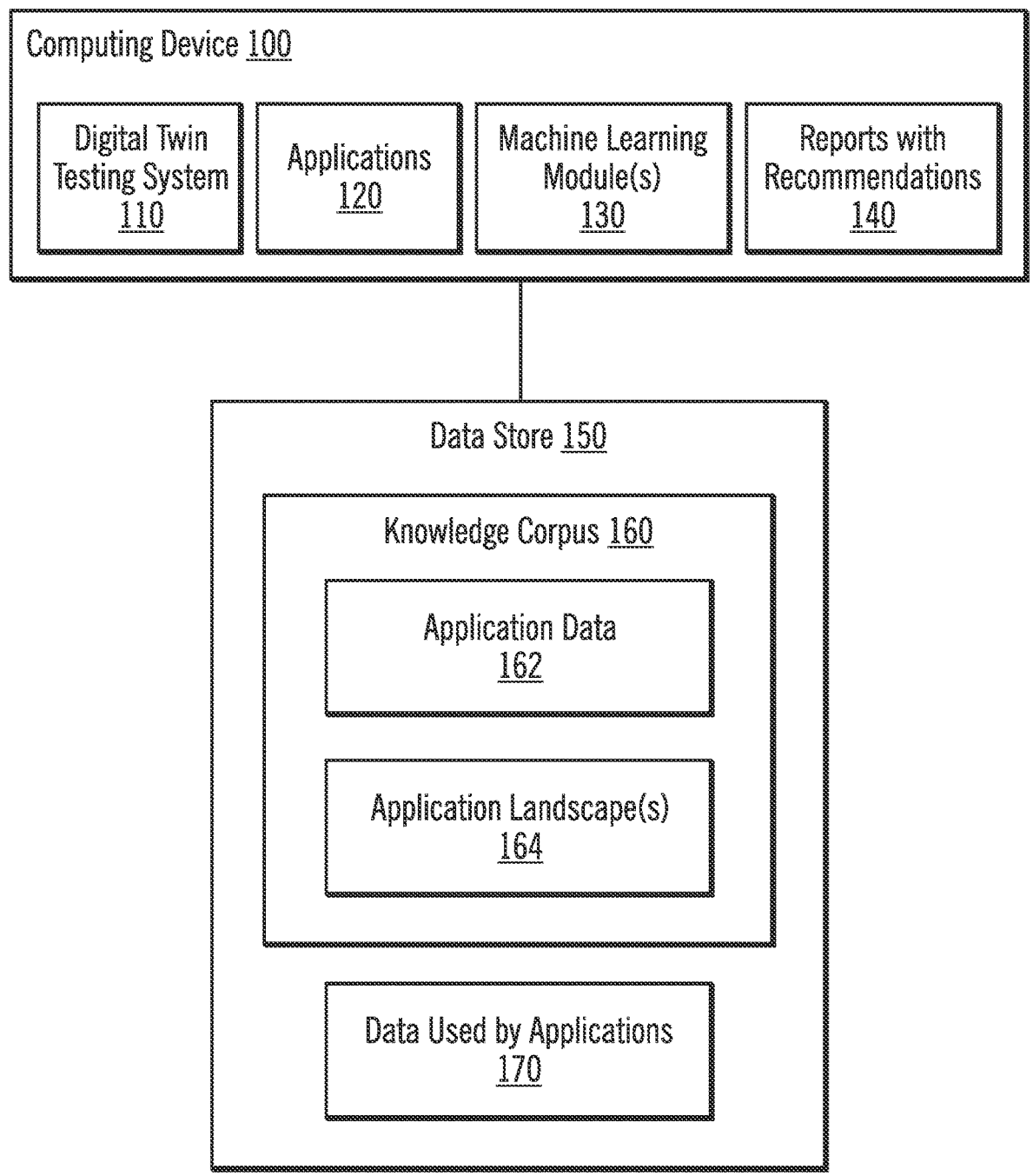
FIG. 1 illustrates, in a block diagram, a computing environment in accordance with certain embodiments.

FIG. 1 illustrates, in a block diagram, a computing environment in accordance with certain embodiments. In FIG. 1, a computing device 100 is connected to a data store 150 either directly or via a network. The computing device 100 includes a digital twin testing system 110, applications 120, one or more machine learning modules 130, and one or more reports. Each of the applications 120 has code that is written to implement functional and non-functional requirements. The code may start as source code that is compiled into object code for execution. Thus, statements that code is being developed or written may be interpreted as source that is being developed or written. Also, statements that code is executed may be interpreted as source code that has been compiled into object code and is ready to execute.

The data store 150 includes a knowledge corpus 160 and data used by applications 170 (i.e., input data for the applications from various sources (data stores, databases, other applications, etc.)).

The knowledge corpus 160 includes application data 162 (describing the application) and one or more application landscapes 164. In certain embodiments, the knowledge corpus 160 includes: the functional and non-functional requirements and historically captured data from each phase of an application lifecycle for applications developed in the past. For example, the historically captured data may include: data about the testing that was performed, how the code was developed, which language was used, what the failure criteria were, etc.

An application landscape 164 may be described as applications that are communicating with each other to perform various activity workflows.

In certain embodiments, the application data 162 and an application landscape 165 for an application being developed is input into a machine learning module 130, which outputs a report 140. In certain embodiments, the report 140 indicates which of the functional and non-functional requirements have been implemented in the code developed so far, which of the functional and non-functional requirements have not been implemented in the code developed so far, and one or more recommendations for modifying the developed code and/or adding new code, where the recommendations may be for the application being developed and/or one or more other applications in the application landscape. In certain embodiments, the report 140 also indicates the impact of the application being developed on other applications in the application landscape and suggestions for changing the application being developed and/or other applications in the application landscape to meet one or more of the functional and non-functional requirements for the application being developed. In certain embodiments, these suggestions for changing the application being developed and/or other applications in the application landscape may be to meet one or more of the functional and non-functional requirements for another application in the application landscape.

An application lifecycle includes a requirements phase (in which functional and non-functional requirements for the application are collected), a design phase (in which the application is designed), a development phase (in which the application is developed into code), and a validation phase (in which the developed application is validated against the functional and non-functional requirements).

In certain embodiments, applications are developed in accordance with Software Development Life Cycle (SDLC), which may be described a process to design, develop, and test applications. The SDLC may define the requirements analysis, design, development, and testing phases.

In certain embodiments, the digital twin testing system 110 provides a framework for validating an application that is being developed against both functional requirements and non-functional requirements. In particular, with embodiments, the design phase and the development phase of an application that is being developed are automatically validated based on both the functional requirements and the non-functional requirements for real customer environments.

In certain embodiments, the digital twin testing system 110 simulates functional and non-functional testing of the applications 120, while individual application functional and non-functional features are being developed (i.e., implemented in code). In this case, the functional and non-functional tests are simulated with various connected (upstream or downstream) applications to create different simulation testing scenarios. That is, the digital twin functional and non-functional simulation testing may use different scenarios of different combinations of upstream applications and downstream applications interacting with the application being developed.

In certain embodiments, test results from initial digital twin functional and non-functional simulation testing may indicate that the functional and non-functional requirements have not been satisfied by the application being developed. In certain embodiments, the digital twin testing system 110 simulates various functional and non-functional requirements (using historical learning) and identifies how the application that is being developed is behaving. Then, any deviation from the expected behavior based on the functional and non-functional requirements may be identified as defects. With embodiments, each functional and non-functional requirement may be tested even when the application being tested is connected with multiple applications and various functional and non-functional requirements are present.

In certain embodiments, while application development is in progress, the digital twin testing system 110 executes functional and non-functional test cases on a real time and/or a near-real time basis in response to the developer checking the validity of the application or compiling the code of the application.

In certain embodiments, while simulating the functional and non-functional testing while the code is being developed, the digital twin testing system 110 considers the entire application landscape and performs simulation of end-to-end tests to identify how the code that is being developing is satisfying the functional and non-functional requirements. The application landscape may be described as the set of applications that interact and/or are dependent on each other. In certain embodiments, an application is related to upstream applications (which may perform processing before the application and/or may process and output data that is input to the application) and downstream applications (which may perform processing after the application and/or may process data that the application output). In certain embodiments, the application landscape may also include services and data (e.g., in data stores) that the applications interact with.

In certain embodiments, the digital twin testing system 110 also considers various other dependent aspects, such as vendor side or third-party related services and their cause and effects on current feature development in the application during the development phase. The digital twin testing system 110 may also execute possible functional and non-functional scenarios to assist the developer and Quality Assurance (QA) teams. In certain embodiments, the digital twin testing system 110 considers historical learning for a similar situation, data volume, complex calculations, etc., and performs digital twin functional and non-functional simulation testing.

In certain embodiments, the digital twin testing system 110 simulates non-functional parameters (e.g., data growth, performance, etc.) based on the current way of implementing the design and/or code. Then, the digital twin testing system 110 may recommend a more effective implementation or may recommend a change in the design.

In certain embodiments, while performing digital twin based functional and non-functional simulation testing, the digital twin testing system 110 considers the current application landscape, along with any acquired applications (e.g., from Mergers and Acquisitions (M&A)). Then, the digital twin testing system 110 may recommend changes to other applications in the application landscape so that overall effectiveness of the application landscape may be increased.

In certain embodiments, based on digital twin functional and non-functional simulation testing results with digital twin computing, the digital twin testing system 110 creates a working and operational manual for effective use of the applications in the application landscape.

In certain embodiments, the digital twin testing system 110 simulates when the application may need maintenance or clean-up activity to regain the non-functional requirements (e.g., by removing old log files, by removing obsolete files, by reindexing, etc.).

In certain embodiments, while an application is being developed, the digital twin testing system 110 simulates how the code that is being developed is compatible with other applications or compatible with one or more functional or non-functional requirements of the other applications. Then, the digital twin testing system 110 simulates additional changes that may be implemented in the other applications.

In certain embodiments, the digital twin testing system 110 simulates the behavior of backward compatibility of an application and dependency resolution. The digital twin testing system 110 may also create backlog tasks for integrated applications with a timeline to migrate to new functionality. The digital twin testing system 110 may track the status of each integrated application to sunset the old functionality from a source application.

In certain embodiments, the digital twin testing system 110, based on new application feature development, detects and automatically places new infrastructure requirements based on the functional and non-functional requirement assessment (e.g., increase physical memory, open firewall rules, add a middleware platform, etc.).

In certain embodiments, while any functional or non-functional test is being simulated, the digital twin testing system 110 creates and maintains a dependency graph. The digital twin testing system 110 may validate whether there are any third party library updates to be considered and any impact analysis while the application is being developed.

In certain embodiments, the digital twin testing system 110, based on the context of the application, simulates the end as-is external scenarios of the application development (e.g., for a supply chain app, the digital twin testing system 110 creates different real-time dependencies, such as bad weather during delivery of goods, out of stock on a product after a user ordered that product, etc.) for each module of different modules to determine the behavior of code at the different modules.

In certain embodiments, the digital twin testing system 110 looks at dependent and independent modules of the application with respect to the simulated code to suggest changes to the code.

Figure 2:
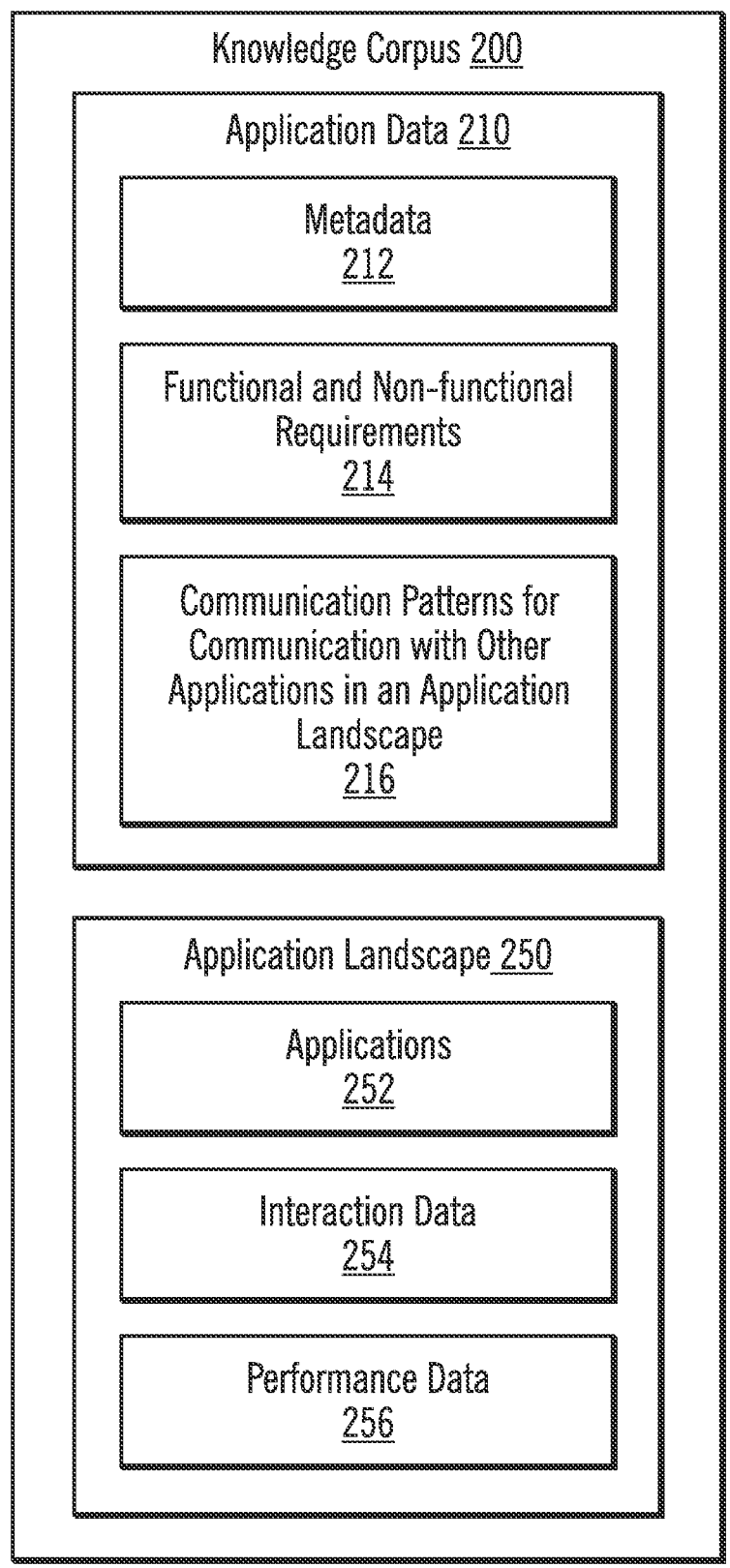
FIG. 2 illustrates, in a block diagram, details of the knowledge corpus 200 in accordance with certain embodiments.

FIG. 2 illustrates, in a block diagram, details of the knowledge corpus 200 in accordance with certain embodiments. The knowledge corpus 200 includes application data 210 for one application and an application landscape 250 that includes that one application. The digital twin testing system 110 may store this application data 210 and an application landscape 250 for each application. The application data 200 includes metadata 212 (e.g., application identifier, user specific information (e.g., Service Level Agreement (SLA)), etc.), functional and non-functional requirements 214 for the application, and communication patterns 216 (which indicate communications with other applications in the application landscape 250). The application landscape 250 includes the applications 252 that are interacting, interaction data 254 that indicates the specific interactions (e.g., Application 1 outputs data to Application 2 and Application 3; Application 3 uses data received from Application 1 and Application 4 to output a report), and performance data. The application landscape 250 also identifies upstream application and downstream application relationships and associated information of the upstream applications and downstream applications.

In certain embodiments, when an application is being developed or is being upgraded, the digital twin testing system 110 receives the application data 210 that includes the functional and non-functional requirements for that application.

In certain embodiments, when the application is already developed and integrated with other applications, and the functional and non-functional requirements are being changed, the digital twin testing system 110 assists with proper application development so that other applications are not negatively impacted (e.g., the other applications are able to meet their own functional and non-functional requirements).

Once the application's functional and non-functional requirements are defined, the digital twin testing system 110 simulates how the functional and non-functional requirements are compatible with the functional and non-functional requirements of other applications in the application landscape.

The digital twin testing system 110 also receives interaction data 254 that indicates how different applications in the application landscape are receiving data, what types of influencing factors may impact different applications, etc. For example, the interaction data 254 may include: source data volume, database query blocking, each query that is being run by another user, server health issues, concurrent users, etc.

The digital twin testing system 110 also receives the interaction data 254, which indicates how different applications are connected to other applications, and uses the interaction data 254 to simulate the entire application landscape.

The digital twin testing system 110 receives the performance data 256, which indicates the actual performance of each application. The performance data 256 may include application logs, data growth rates, available space, etc. In certain embodiments, the performance data 256 indicates whether the non-functional requirements are being met.

The digital twin testing system 110 simulates how individual applications are performing, and this includes the number of users, performance of the applications, etc.

With embodiments, the digital twin testing system 110 is able to check the health of any application in the application landscape. For example, the digital twin testing system 110 may identify that the database available memory is below a certain percent, may identify slowness of a server, may determine that an incident (i.e., issue or problem) was reported, may identify data issues, may identify that jobs are failing, etc.

While the application is being developed, the digital twin testing system 110 identifies which functional and non-functional requirements have not been developed yet and which functional and non-functional requirements have already been developed. For the functional and non-functional requirements which are not developed, the digital twin testing system 110 treats the code for these undeveloped functional and non-functional requirements as developed per the expected functional and non-functional requirements. That is, the undeveloped functional and non-functional requirements are considered to be high quality code that meets expectations.

For the functional and non-functional requirements, the digital twin testing system 110 analyzes the code and uses actual analyzed data for the simulation. That is, the digital twin testing system 110 analyzes the code of an application to check whether the code implements the functional and non-functional requirements and determines whether best practices have been used. If any of the functional and non-functional requirements have not been implemented in the code, the digital twin testing system 110 provides recommendations for revising the code to implement the missing functional and non-functional requirements.

For the functional and non-functional requirements, the digital twin testing system 110 determines which portions are already included in the developed code and which are not included in the developed code, and, accordingly identifies the near-real time code quality. For example, a developer may be developing a total of 1000 lines of code. At a certain point, 600 lines of the code have been developed, while 400 lines of code remain to be developed. By analyzing the code, the digital twin testing system 110 determines which functional and non-functional are implemented in the 600 lines of code.

While the simulation is being performed, the digital twin testing system 110 takes into consideration the other applications in the application landscape and how the applications are related in the application landscape with reference to how the application is being developed. The digital twin testing system 110 also takes into account which functional and non-functional requirements have been developed and the quality and functionality of the code. For example, the digital twin testing system 110 may identify a downstream application that has slow performance if the current application is deployed in production and recommends a change to avoid this issue (e.g., recommending adding more data storage, more processing power, changing the downstream application, etc.).

With the application data and the application landscape, the digital twin testing system 110 executes the simulation and identifies how compatible the application is with the application landscape. In certain embodiments, the digital twin testing system 110 executes the code that has been developed so far with simulated data. In certain embodiments, the digital twin testing system 110 considers how much code has been developed and how much is pending (i.e., is to be developed). The digital twin testing system 110 executes actual code for the developed part and performs a simulation for the non-developed code based on historical learning of what the code is likely to do (e.g., by estimating a folder size, etc.).

Based on the simulation, the digital twin testing system 110 recommends which portions of the code should be modified. Also, the digital twin testing system 110 identifies which other applications in the application landscape are impacted because of the current development status of the application.

The digital twin testing system 110 also identifies possible changes in other applications in the application landscape because of the current changes in the application being developed.

The digital twin testing system 110 recommends changes the application being developed and to other applications in the application landscape so that the functional and non-functional requirements are satisfied for the applications in the application landscape.

Figure 3:
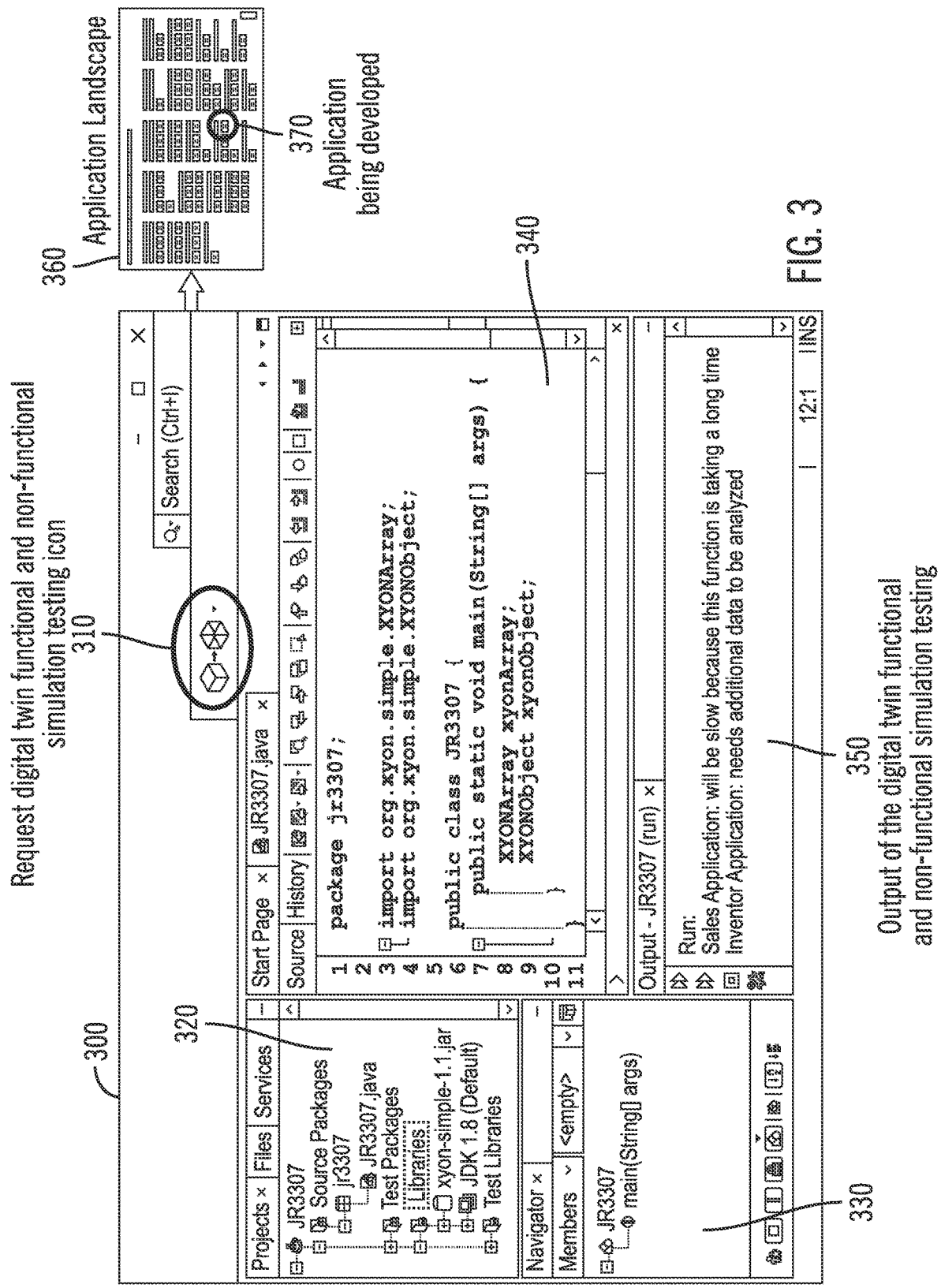
FIG. 3 illustrates a user interface for digital twin functional and non-functional simulation testing in accordance with certain embodiments.

FIG. 3 illustrates a user interface 300 for digital twin functional and non-functional simulation testing in accordance with certain embodiments. In FIG. 3, "xyon" and "XYON" refer to object notations. For example, JavaScript@ Object Notation (JSON) is one type of object notation (JavaScript is a registered trademark of Oracle Corporation in the United States and/or other countries). The user interface includes an icon 310 for starting digital twin functional and non-functional simulation testing. Also, window 320 allows selection of a project, file, or service. Then, window 330 allows navigation to the code of the application being developed and that is to be simulated. In the example of FIG. 3, code JR3307 is selected and the icon 310 is selected. Then, the digital twin testing system 110 performs digital twin functional and non-functional simulation testing, with window 340 displaying a software Integrated Development Environment (IDE) and window 350 displaying output of the digital twin functional and non-functional simulation testing. In addition, the application 370 being developed is part of the application landscape 360.

Continuing with the example of FIG. 3, a developer is developing the code for the application 370, and, while the code is being developed, the developer performs a syntax check, compiles the code, and performs digital twin functional and non-functional simulation testing of the code taking into account the entire landscape. Then, the digital twin testing system 110 provides output 350 with recommendations and indicates whether the current way of development satisfies the functional and non-functional requirements with respect to the entire application landscape.

Figure 4:
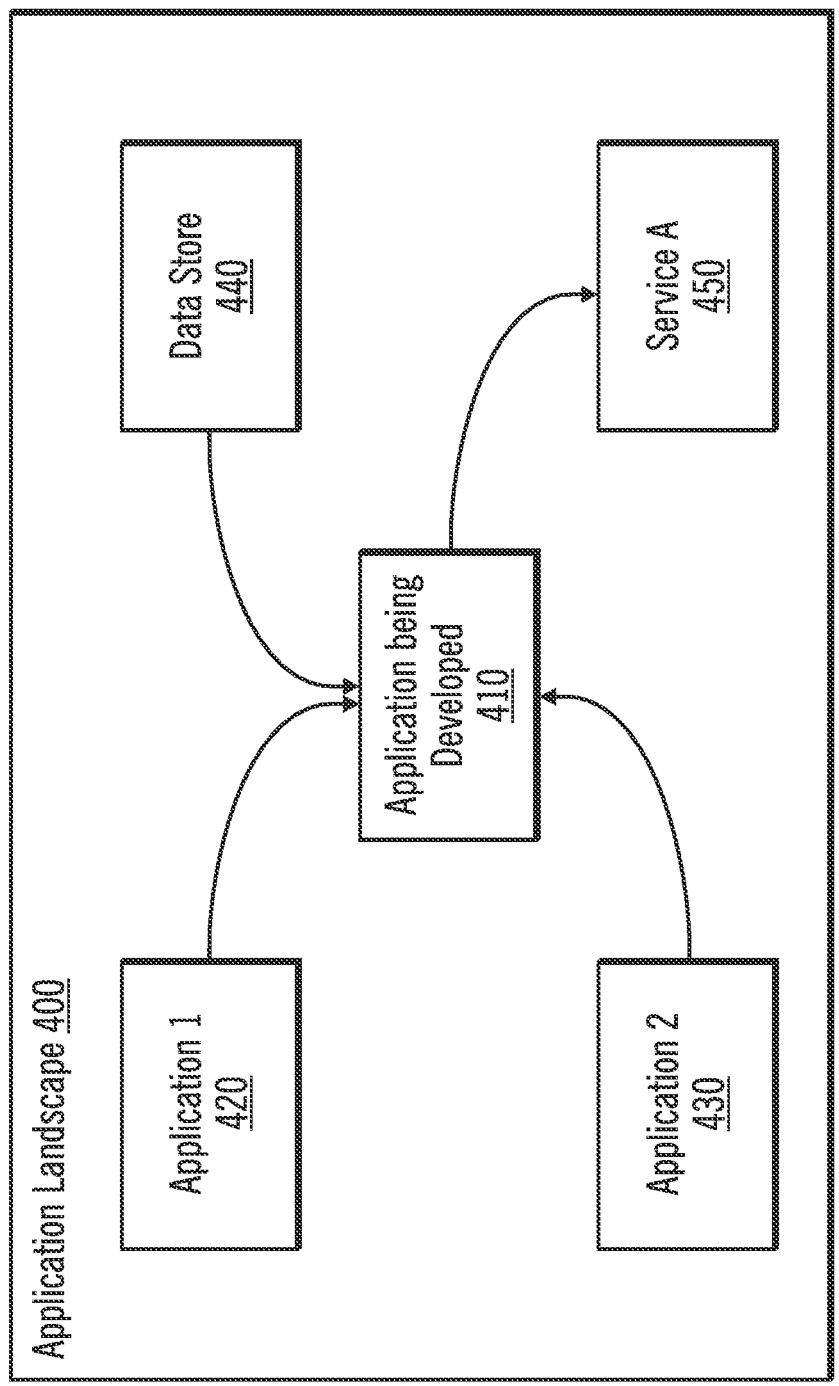
FIG. 4 illustrates, in a block diagram, an application landscape and application data in accordance with certain embodiments.

FIG. 4 illustrates, in a block diagram, an application landscape 400 in accordance with certain embodiments. In the application landscape 400, an application being developed 410 received input from Application1 420, Application2 430, and Data Store 440. Then, the application being developed does some processing on the input and sends output to Service 450. In certain embodiments, the application landscape 400 may also show services invoked by the applications and data that input to or output by the applications.

Figure 5A:
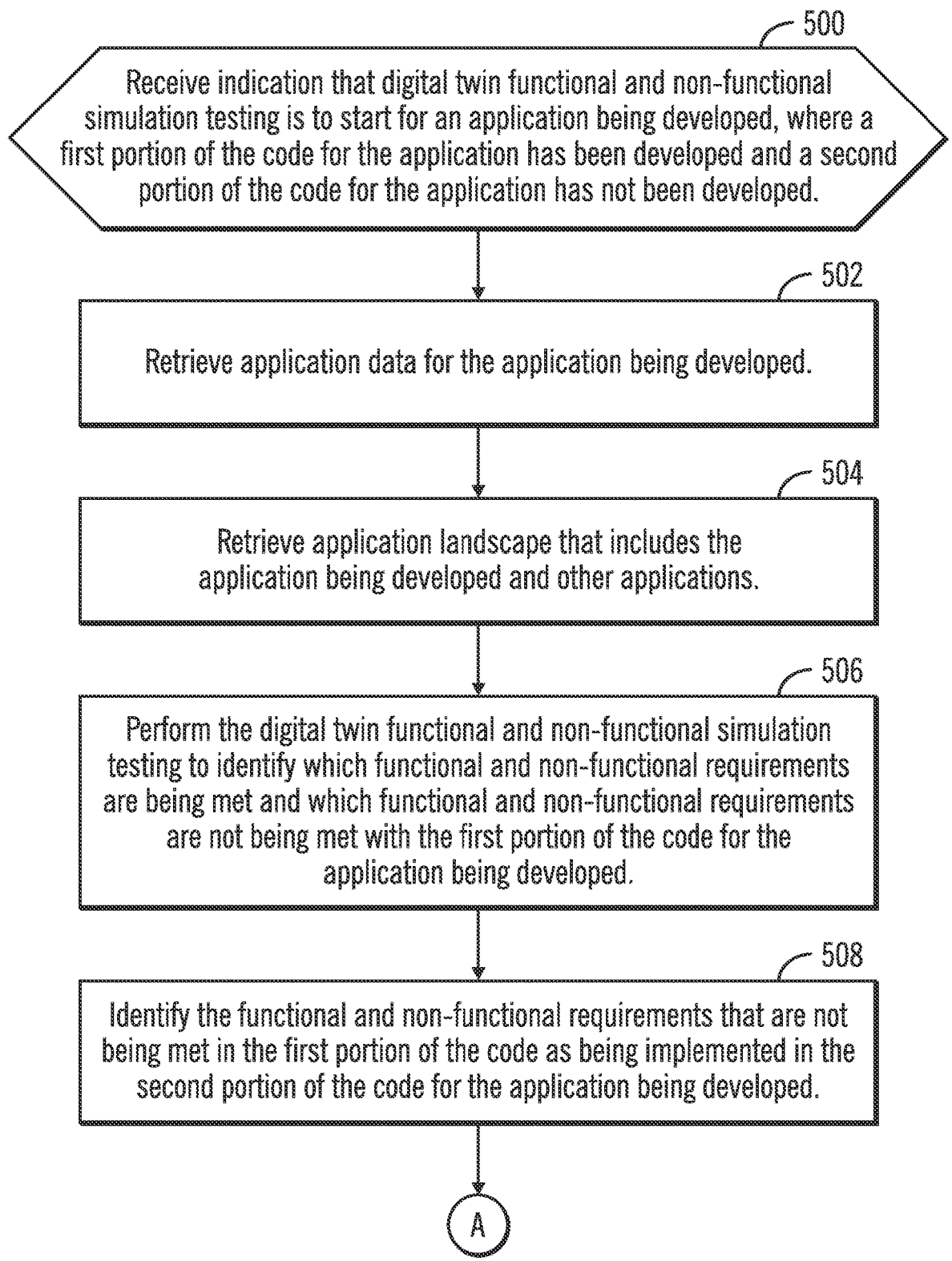
FIGS. 5A and 5B illustrate, in a flowchart, operations for performing digital twin simulation testing accordance with certain embodiments.
Figure 5B:
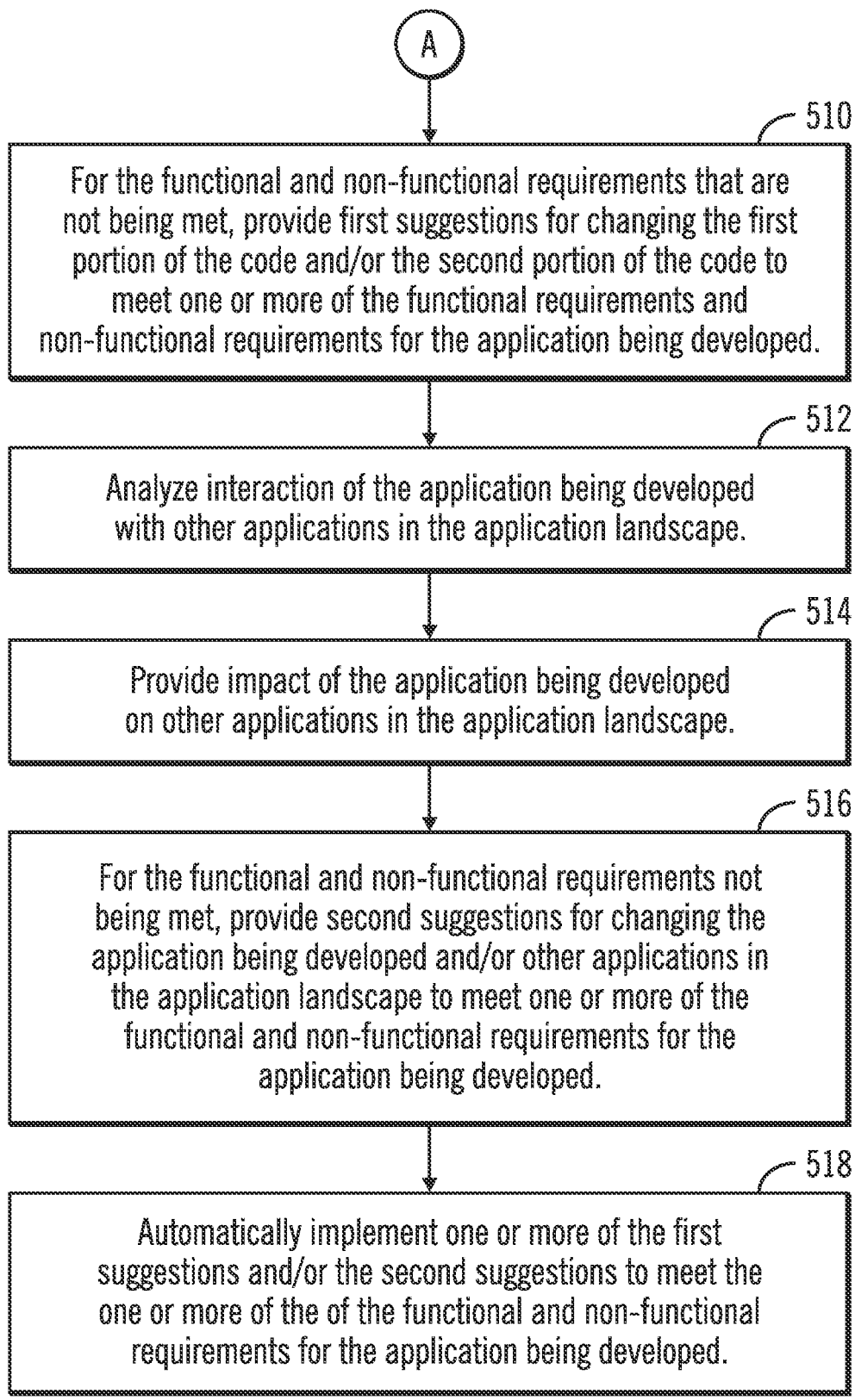

FIGS. 5A and 5B illustrate, in a flowchart, operations for performing digital twin functional and non-functional simulation testing accordance with certain embodiments. Control begins at block 500 with the digital twin testing system 110 receiving an indication that digital twin functional and non-functional simulation testing (i.e., simulation testing) is to start for an application being developed, where a first portion of the code for the application has been developed and a second portion of the code for the application has not been developed yet. In certain embodiments, the indication is receiving selection of the icon 310 in the user interface 300. In certain other embodiments, while application development is in progress, the digital twin testing system 110 receives the indication based on detecting that the validity of the application being developed is being checked or that the application being developed has code that is being compiled.

In block 502, the digital twin testing system 110 retrieves application data for the application being developed. In certain embodiments, the application being developed has an identifier, and the identifier is used to locate the application data stored for the application being developed.

In block 504, the digital twin testing system 110 retrieves an application landscape that includes the application being developed and other applications. In certain embodiments, the application being developed has an identifier, and the identifier is used to locate the application landscape stored for the application being developed.

In block 506, the digital twin testing system 110 performs digital twin functional and non-functional simulation testing on the application being developed to identify which functional and non-functional requirements are being met and which functional and non-functional requirements are not being met with the first portion of the code for the application being developed. This simulation may include analyzing the first portion of the code and the functional and non-functional requirements to determine which of the functional and non-functional requirements are implemented in the first portion of the code and which of the functional and non-functional requirements are not implemented in the first portion of the code. This simulation may also include executing the first portion of the code that has been developed and analyzing the execution to identify which functional and non-functional requirements have been implemented in the first portion of the code and which of the functional and non-functional requirements are not implemented in the first portion of the code. In certain embodiments, the digital twin testing system 110 identifies the functional and non-functional requirements that are not being met in the first portion of the code as being implemented in the second portion of the code.

In certain embodiments, the digital twin testing system 110 performs digital twin functional and non-functional simulation testing on portions of the code that have been developed (by executing that code) and portions that are still to be developed (based on historical data on the functional and non-functional requirements that may have been implemented in other code and that are found not to be implemented in the code developed so far) to simulate the overall impact of the application. In certain embodiments, if the historical data does not include a functional or non-functional requirement that is the same or similar to one to be developed, the digital twin testing system 110 treats that functional or non-functional requirement as one that will be implemented properly in the second portion of the code. Thus, without complete development of the code for the application, the simulation may be performed. For example, the historical data may indicate that if a table does not have a primary key, then for the code to be developed, there may be an issue and a recommendation to create a primary key is provided. This information may be part of a report 140.

In block 508, the digital twin testing system 110 identifies the functional and non-functional requirements that are not being met in the first portion of the code as being implemented in the second portion of the code for the application being developed. In certain embodiments, the digital twin testing system 110 performs digital twin functional and non-functional simulation testing on the second portion of the code using historical data. In certain embodiments, the second portion of the code may be identified by the digital twin testing system 110 as implementing the functional and non-functional requirements that have not already been implemented in the first portion of the code, and the digital twin testing system 110 performs digital twin functional and non-functional simulation testing on the functional and non-functional requirements based on historical data on how those functional and non-functional requirements were implemented in other applications that were previously simulation tested. In certain embodiments, if historical data is not available for the functional and non-functional requirements that are not being met in the first portion of the code, the digital twin testing system 110 deems these functional and non-functional requirements as being properly met in the second portion of the code. From block 508 (FIG. 5A), processing continues to block 510 (FIG. 5B).

In block 510, for the functional and non-functional requirements that are not being met, the digital twin testing system 110 provides first suggestions for changing (i.e., modifying existing code and/or adding new code) the first portion of the code and/or the second portion of the code to meet one or more of the functional requirements and non-functional requirements for the application being developed. That is, the suggestions may apply to one or both of the first portion of the code and the second portion of the code. The suggestions may be for portions of the code that have not been developed yet or for portions of the code that have already been developed. Also, any suggestion may be for a functional requirement, for a non-functional requirement or for both a functional requirement and a non-functional requirement. The first suggestions may be part of the report 140.

In block 512, the digital twin testing system 110 analyzes the interaction of the application being developed with other applications in the application landscape. In certain embodiments, the digital twin testing system 110 compares the functional and non-functional requirements of each of the applications in the application landscape to determine how they interact overall. In certain embodiments, the knowledge corpus is created based on historical learning, different testing of code of applications, test results from testing the code of applications, actual test results from already deployed applications, incidents, etc. Then, when a new application is being developed, the digital twin testing system 110 uses this historical data to perform a simulation of code that is to be developed.

In block 514, the digital twin testing system 110 provides the impact of the application being developed on other applications in the application landscape. This impact may be part of the report 140.

In block 516, for functional and non-functional requirements not being met, the digital twin testing system 110 provides second suggestions for changing (i.e., modifying existing code and/or adding new code) the application being developed and/or other applications in the application landscape to meet one or more of the functional and non-functional requirements for the application being developed. That is, the suggestions may apply to one or both of the application being developed and other applications in the application landscape. The second suggestions may be part of the report 140.

In block 518, the digital twin testing system 110 automatically implements one or more of the first suggestions and/or the second suggestions to meet the one or more of the functional and non-functional requirements for the application being developed. The first suggestions and the second suggestions may overlap or may not overlap. Some of the first suggestions may also be repeated in the second suggestions. Examples of first suggestions and/or second suggestions include: suggesting deployment of another server, suggesting adding of more storage to improve performance, suggesting adding of another processor or a faster processer, suggesting editing of specific code that has been developed, suggesting adding of specific code for portions of the code that have not been developed yet, etc. Thus, to meet the functional and non-functional requirements, the digital twin testing system 110 may automatically provision additional resources (e.g., storage, processor, server, etc.) or may automatically modify code (e.g., editing existing code or providing new code).

While any application is developed, various functional and non-functional requirements are considered, and, accordingly, an application is developed. Before the application is moved to production, the digital twin testing system 110 performs various functional and non-functional testing. Although it may be difficult for a technical team to perform such testing, the digital twin testing system 110 is able to perform near real time digital twin functional and non-functional simulation testing. Thus, while the application is being developed, if the functionality is incorrectly being implemented in code or the non-functional requirements are not being met, the digital twin testing system 110 provides near real time digital twin functional and non-functional simulation testing provides suggestions to correct any issues to avoid further design, development, and validation cycles for the application being developed.

Figure 6:
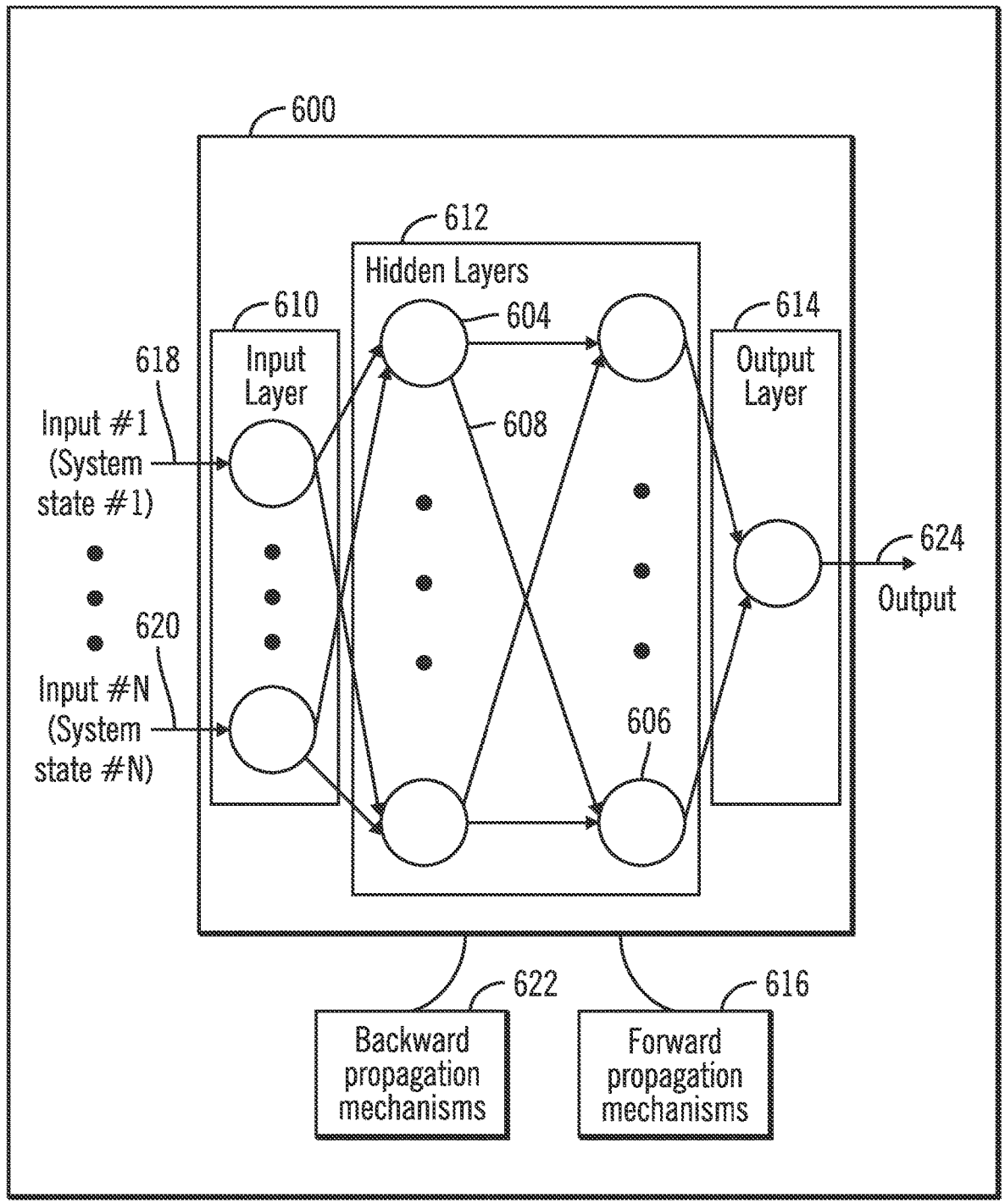
FIG. 6 illustrates, in a block diagram, details of a machine learning module in accordance with certain embodiments.

FIG. 6 illustrates, in a block diagram, details of a machine learning module 600 in accordance with certain embodiments. In certain embodiments, each of the one or more machine learning modules 130 are implemented using the components of the machine learning module 600.

The machine learning module 600 may comprise a neural network with a collection of nodes with links connecting them, where the links are referred to as connections. For example, FIG. 6 shows a node 604 connected by a connection 608 to the node 606. The collection of nodes may be organized into three main parts: an input layer 610, one or more hidden layers 612, and an output layer 614.

The connection between one node and another is represented by a number called a weight, where the weight may be either positive (if one node excites another) or negative (if one node suppresses or inhibits another). Training the machine learning module 600 entails calibrating the weights in the machine learning module 600 via mechanisms referred to as forward propagation 616 and backward propagation 622. Bias nodes that are not connected to any previous layer may also be maintained in the machine learning module 600. A bias may be described as an extra input of 1 with a weight attached to it for a node.

In forward propagation 616, a set of weights are applied to the input data 618 . . . 620 to calculate the output 624. For the first forward propagation, the set of weights may be selected randomly or set by, for example, a system administrator. That is, in the forward propagation 616, embodiments apply a set of weights to the input data 618 . . . 620 and calculate an output 624.

In backward propagation 622 a measurement is made for a margin of error of the output 624, and the weights are adjusted to decrease the error. Backward propagation 622 compares the output that the machine learning module 600 produces with the output that the machine learning module 600 was meant to produce, and uses the difference between them to modify the weights of the connections between the nodes of the machine learning module 600, starting from the output layer 614 through the hidden layers 612 to the input layer 610, i.e., going backward in the machine learning module 600. In time, backward propagation 622 causes the machine learning module 600 to learn, reducing the difference between actual and intended output to the point where the two come very close or coincide.

The machine learning module 600 may be trained using backward propagation to adjust weights at nodes in a hidden layer to produce adjusted output values based on the provided inputs 618 . . . 620. A margin of error may be determined with respect to the actual output 624 from the machine learning module 600 and an expected output to train the machine learning module 600 to produce the desired output value based on a calculated expected output. In backward propagation, the margin of error of the output may be measured and the weights at nodes in the hidden layers 612 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning module 600 is configured to repeat both forward and backward propagation until the weights of the machine learning module 600 are calibrated to accurately predict an output.

The machine learning module 600 implements a machine learning technique such as decision tree learning, association rule learning, artificial neural network, inductive programming logic, support vector machines, Bayesian models, etc., to determine the output value 624.

In certain machine learning module 600 implementations, weights in a hidden layer of nodes may be assigned to these inputs to indicate their predictive quality in relation to other of the inputs based on training to reach the output value 624.

With embodiments, the machine learning module 600 is a neural network, which may be described as a collection of "neurons" with "synapses" connecting them.

With embodiments, there may be multiple hidden layers 612, with the term "deep" learning implying multiple hidden layers. Hidden layers 612 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 616 and the backward propagation 622.

In backward propagation 622, embodiments measure the margin of error of the output and adjust the weights accordingly to decrease the error.

Neural networks repeat both forward and backward propagation until the weights are calibrated to accurately predict the output 624.

In certain embodiments, the machine learning module 600 may be refined based on whether the outputs are indicated as accurate.

Figure 7:
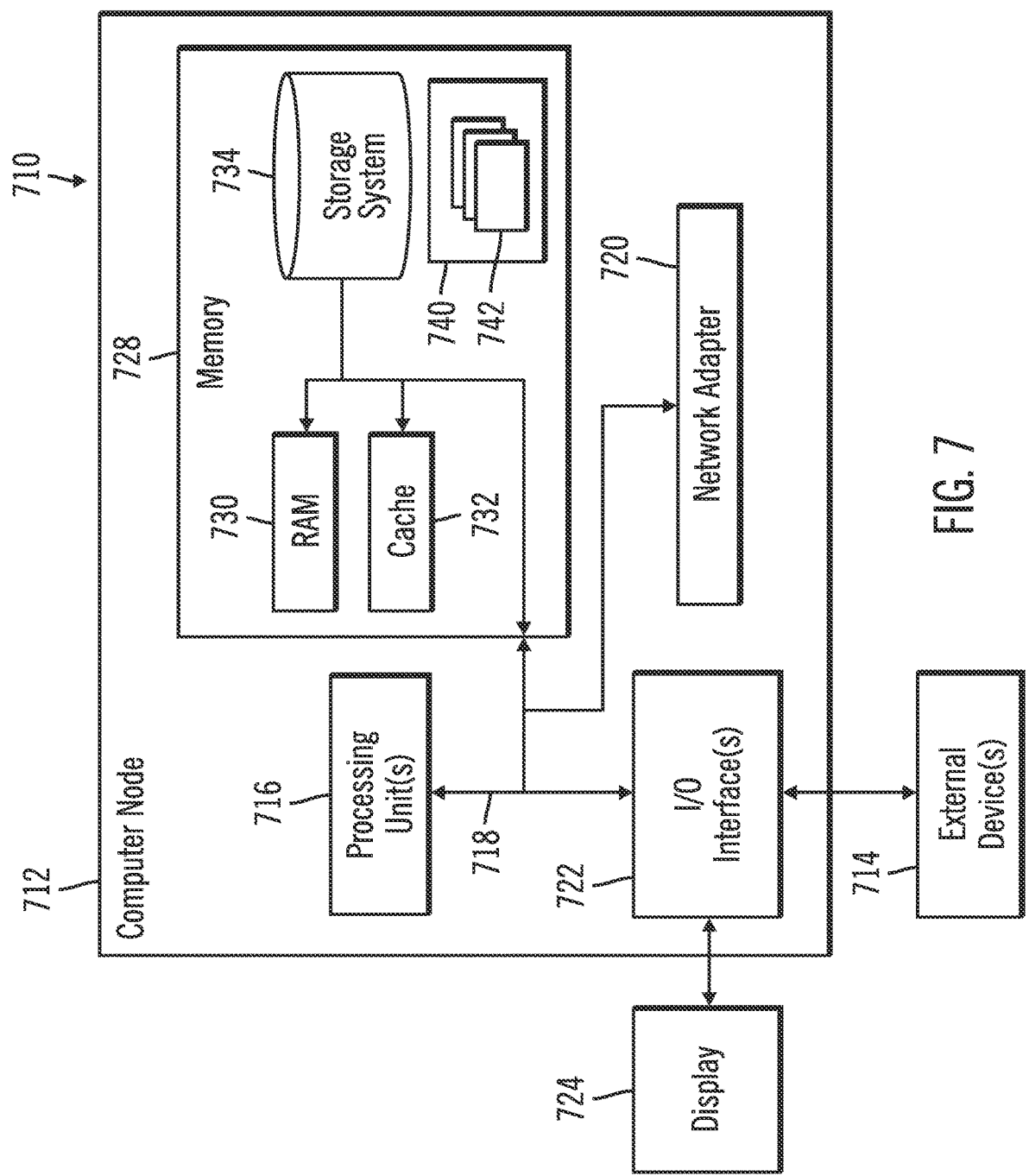
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, Redundant Array of Inexpensive Disks (RAID) systems, tape drives, and data archival storage systems, etc.

In certain embodiments, the computing device 100 has the architecture of computer node 712. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
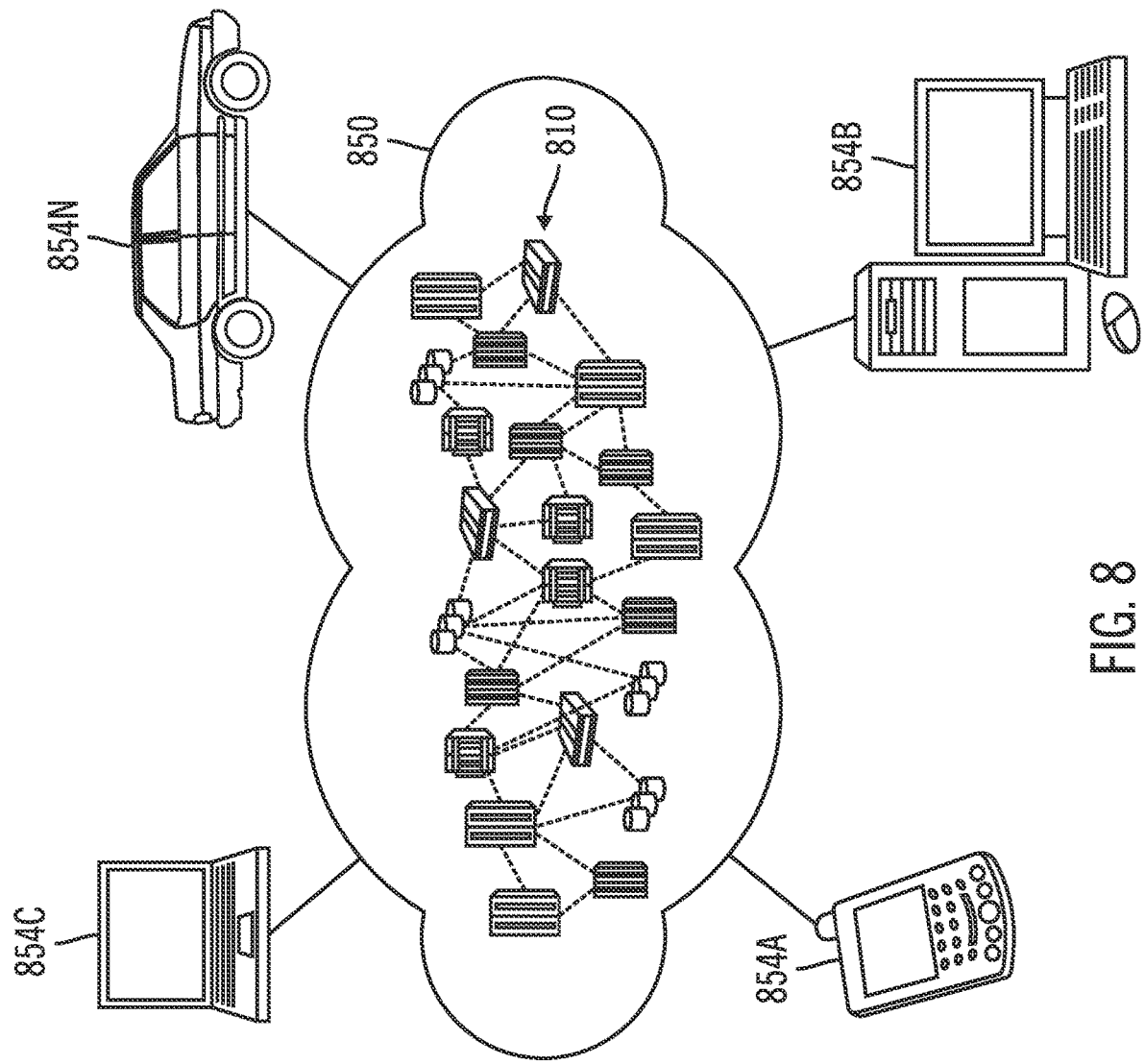
FIG. 8 illustrates a cloud computing environment in accordance with certain embodiments.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
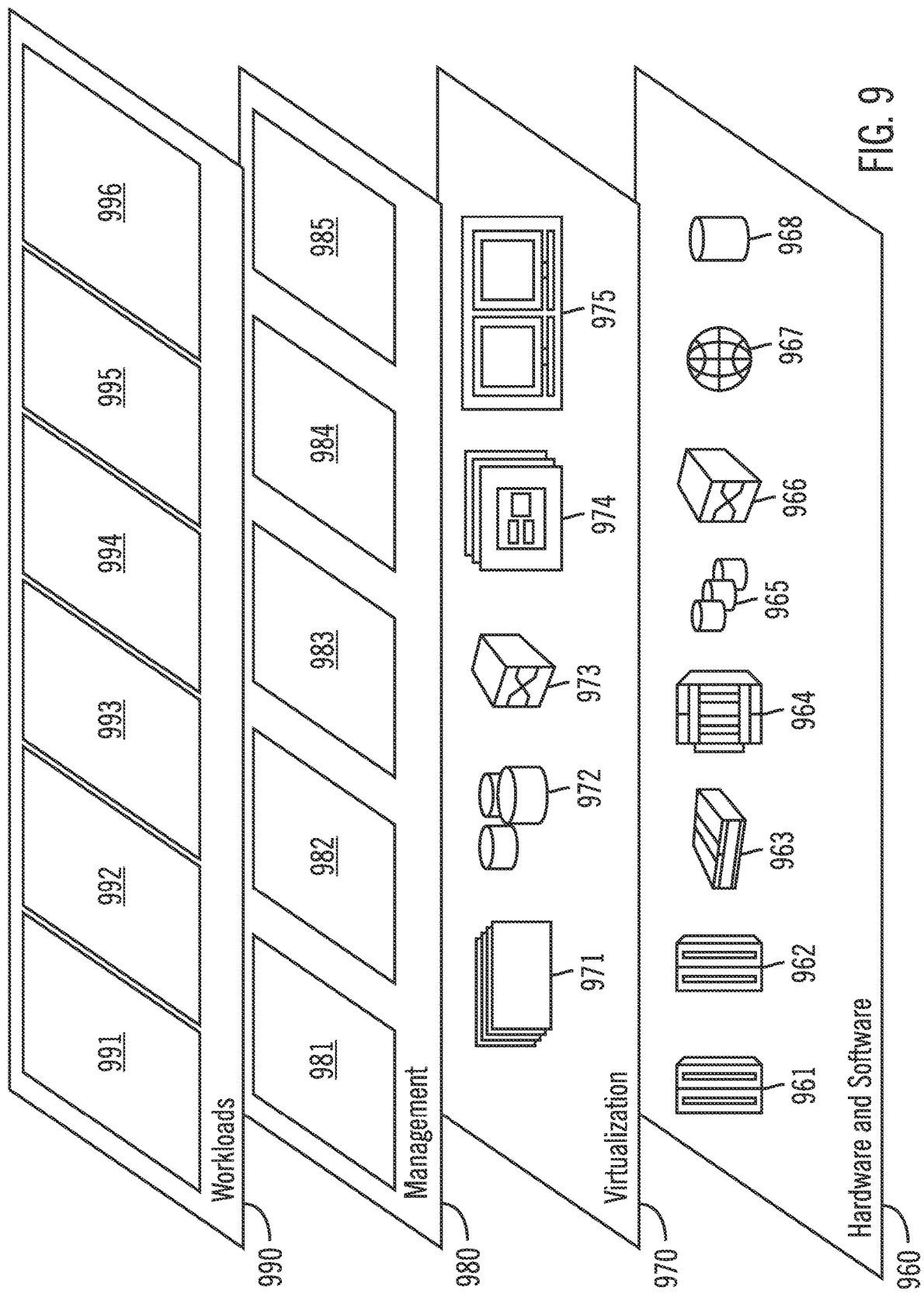
FIG. 9 illustrates abstraction model layers in accordance with certain embodiments.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and digital twin functional and non-functional simulation testing 996.

Thus, in certain embodiments, software or a program, implementing digital twin functional and non-functional simulation testing in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:

receiving an indication that digital twin functional and non-functional simulation testing is to start for an application being developed, wherein a first portion of code for the application has been developed and a second portion of the code for the application has not been developed;

retrieving application data that includes functional and non-functional requirements for the application being developed;

retrieving an application landscape for the application being developed, wherein the application landscape includes the application being developed, other applications, and interaction data that indicates interactions between the application and the other applications, and wherein the other applications comprise upstream applications and downstream applications;

performing the digital twin functional and non-functional simulation testing of the application and the other applications of the application landscape using the interaction data to simulate the application landscape with different combinations of the upstream applications and the downstream applications interacting with the application being developed and identifying which functional and non-functional requirements are being met and which functional and non-functional requirements are not being met by the first portion of the code;

for the functional and non-functional requirements that are not being met, providing one or more first suggestions for at least one of the first portion and the second portion to meet one or more of the functional and non-functional requirements;

providing an impact of the application being developed on one or more of the other applications in the application landscape with one or more second suggestions for changing the application being developed; and implementing at least one of the first suggestions or the second suggestions to meet the one or more of the functional and non-functional requirements.

2. The computer-implemented method of claim 1, further comprising operations for:

identifying at least one of the functional and non-functional requirements that are not being met in the first portion of the code as being implemented in the second portion of the code.

3. The computer-implemented method of claim 1, further comprising operations for:

for the functional and non-functional requirements not being met, providing additional suggestions for changing one of the other applications in the application landscape to meet one or more of the functional and non-functional requirements for the application being developed.

4. The computer-implemented method of claim 1, wherein the non-functional requirements comprise performance objectives.

5. The computer-implemented method of claim 1, wherein a Software as a Service (SaaS) is configured to perform the operations of the method.

6. A computer program product, the computer program product comprising a computer readable storage medium having program code embodied therewith, the program code executable by at least one processor to perform operations for:

receiving an indication that digital twin functional and non-functional simulation testing is to start for an application being developed, wherein a first portion of code for the application has been developed and a second portion of the code for the application has not been developed;

retrieving application data that includes functional and non-functional requirements for the application being developed;

retrieving an application landscape for the application being developed, wherein the application landscape includes the application being developed, other applications, and interaction data that indicates interactions between the application and the other applications, and wherein the other applications comprise upstream applications and downstream applications;

performing the digital twin functional and non-functional simulation testing of the application and the other applications of the application landscape using the interaction data to simulate the application landscape with different combinations of the upstream applications and the downstream applications interacting with the application being developed and identifying which functional and non-functional requirements are being met and which functional and non-functional requirements are not being met by the first portion of the code;

for the functional and non-functional requirements that are not being met, providing one or more first suggestions for at least one of the first portion and the second portion to meet one or more of the functional and non-functional requirements;

providing an impact of the application being developed on one or more of the other applications in the application landscape with one or more second suggestions for changing the application being developed; and implementing at least one of the first suggestions or the second suggestions to meet the one or more of the functional and non-functional requirements.

7. The computer program product of claim 6, wherein the program code is executable by the at least one processor to perform operations for:

identifying at least one of the functional and non-functional requirements that are not being met in the first portion of the code as being implemented in the second portion of the code.

8. The computer program product of claim 6, wherein the program code is executable by the at least one processor to perform operations for:

for the functional and non-functional requirements not being met, providing additional suggestions for changing one of the other applications in the application landscape to meet one or more of the functional and non-functional requirements for the application being developed.

9. The computer program product of claim 6, wherein the non-functional requirements comprise performance objectives.

10. The computer program product of claim 6, wherein a Software as a Service (SaaS) is configured to perform the operations of the computer program product.

11. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

receiving an indication that digital twin functional and non-functional simulation testing is to start for an application being developed, wherein a first portion of code for the application has been developed and a second portion of the code for the application has not been developed;

retrieving application data that includes functional and non-functional requirements for the application being developed;

retrieving an application landscape for the application being developed, wherein the application landscape includes the application being developed, other applications, and interaction data that indicates interactions between the application and the other applications, and wherein the other applications comprise upstream applications and downstream applications;

performing the digital twin functional and non-functional simulation testing of the application and the other applications of the application landscape using the interaction data to simulate the application landscape with different combinations of the upstream applications and the downstream applications interacting with the application being developed and identifying which functional and non-functional requirements are being met and which functional and non-functional requirements are not being met by the first portion of the code;
for the functional and non-functional requirements that are not being met, providing one or more first suggestions for at least one of the first portion and the second portion to meet one or more of the functional and non-functional requirements;
providing an impact of the application being developed on one or more of the other applications in the application landscape with one or more second suggestions for changing the application being developed; and
implementing at least one of the first suggestions or the second suggestions to meet the one or more of the functional and non-functional requirements.

12. The computer system of claim 11, wherein the operations further comprise:
identifying at least one of the functional and non-functional requirements that are not being met in the first portion of the code as being implemented in the second portion of the code.

13. The computer system of claim 11, wherein the operations further comprise:
for the functional and non-functional requirements not being met, providing additional suggestions for changing one of the other applications in the application landscape to meet one or more of the functional and non-functional requirements for the application being developed.

14. The computer system of claim 11, wherein a Software as a Service (SaaS) is configured to perform the operations of the computer system.

15. The computer-implemented method of claim 1, wherein the interaction data comprises: source data volume, database query blocking, each query that is being run by another user, server health issues, and concurrent users.

16. The computer-implemented method of claim 1, wherein at least one of the functional and non-functional requirements is changed.

17. The computer program product of claim 6, wherein the interaction data comprises: source data volume, database query blocking, each query that is being run by another user, server health issues, and concurrent users.

18. The computer program product of claim 6, wherein at least one of the functional and non-functional requirements is changed.

19. The computer system of claim 11, wherein the interaction data comprises:
source data volume, database query blocking, each query that is being run by another user, server health issues, and concurrent users.

20. The computer system of claim 11, wherein at least one of the functional and non-functional requirements is changed.

* * * * *